(12) United States Patent
Murakami et al.

(10) Patent No.: US 12,203,026 B2
(45) Date of Patent: Jan. 21, 2025

(54) DISPERSION OF SURFACE-TREATED SILICA-CONTAINING INORGANIC OXIDE PARTICLES AND METHOD FOR PRODUCING SAME

(71) Applicant: NISSAN CHEMICAL CORPORATION, Tokyo (JP)

(72) Inventors: Satoru Murakami, Sodegaura (JP); Masashi Abe, Sodegaura (JP); Hirotake Kitagawa, Sodegaura (JP); Takahiro Ohori, Sodegaura (JP); Masaya Kashihara, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/688,274

(22) PCT Filed: Aug. 26, 2022

(86) PCT No.: PCT/JP2022/032245
§ 371 (c)(1),
(2) Date: Feb. 29, 2024

(87) PCT Pub. No.: WO2023/032854
PCT Pub. Date: Mar. 9, 2023

(65) Prior Publication Data
US 2024/0271043 A1    Aug. 15, 2024

(30) Foreign Application Priority Data

Aug. 31, 2021   (JP) ................................. 2021-141201

(51) Int. Cl.
C09K 23/54    (2022.01)
C01B 13/14    (2006.01)
C09C 3/12     (2006.01)

(52) U.S. Cl.
CPC ............ *C09K 23/54* (2022.01); *C01B 13/145* (2013.01); *C09C 3/12* (2013.01)

(58) Field of Classification Search
CPC .......... C09K 23/54; C01B 13/145; C09C 3/12
See application file for complete search history.

(56) References Cited

U.S. PATENT DOCUMENTS

| 6,025,455 A | 2/2000 | Yoshitake et al. |
| 2006/0112860 A1 | 6/2006 | Yoshitake et al. |
| 2007/0003701 A1 | 1/2007 | Yoshitake et al. |
| 2010/0021725 A1 | 1/2010 | Gottschalk-Gaudig |
| 2013/0029258 A1 | 1/2013 | Christopher et al. |
| 2016/0130425 A1 | 5/2016 | Yoshitake et al. |

FOREIGN PATENT DOCUMENTS

| JP | H11-43319 A | | 2/1999 |
| JP | H1143319 | * | 2/1999 |
| JP | 2005-200294 A | | 7/2005 |
| JP | 2005-314197 A | | 11/2005 |
| JP | 2009-13033 A | | 1/2009 |
| JP | 2016-204168 A | | 12/2016 |
| JP | 2020-164374 A | | 10/2020 |
| WO | 2020/110023 A1 | | 6/2020 |

OTHER PUBLICATIONS

Nov. 15, 2022 International Search Report issued in PCT/JP2022/032245.
Nov. 15, 2022 Written Opinion issued in PCT/JP2022/032245.
Apr. 16, 2024 Office Action issued in Korean Application No. 10-2024-7009109.
Dec. 6, 2023 Office Action issued in Japanese Patent Application 2023-545531.
Oct. 24, 2024 Office Action issued in European Application No. 22864438.1.

* cited by examiner

*Primary Examiner* — Robert S Jones, Jr.
*Assistant Examiner* — Jiangtian Xu
(74) *Attorney, Agent, or Firm* — Oliff PLC

(57) ABSTRACT

A dispersion includes silane-bonded inorganic oxide particles having surfaces modified with a hydrolyzable silane, and a liquid dispersion medium which contains a hydrolysate of the hydrolyzable silane; the ratio of (the number of moles of silicon atoms of the hydrolysate of the hydrolyzable silane in the dispersion medium)/(the number of moles of silicon atoms of the silane bonded to the surfaces of the particles) is 0.2 to 30; and Q4 is greater than that before the surface modification with silane, wherein Q4 corresponds to the case where the number of bridging oxygen atoms between silicon atoms of the silica particles is 4/2 per one silicon atom as determined by Si-NMR observation. The inorganic oxide particles have an average diameter of 5 nm to 100 nm and are particles of silica and at least one inorganic oxide from the group of alumina, tin oxide, zirconium oxide, titanium oxide, and antimony oxide.

6 Claims, No Drawings

DISPERSION OF SURFACE-TREATED SILICA-CONTAINING INORGANIC OXIDE PARTICLES AND METHOD FOR PRODUCING SAME

TECHNICAL FIELD

The present invention relates to a dispersion of silica-containing inorganic oxide particles having silane-treated surfaces, and a production method therefor.

BACKGROUND ART

A dispersion of silica-containing inorganic oxide particles (in particular, a silica sol) is a liquid prepared by dispersing silica particles in a dispersion medium. Silica particles are highly dispersed in a dispersion medium by a method wherein the absolute value of zeta potential between silica particles is increased to thereby enhance the repulsion between the silica particles. One example of such a method involves modifying the surfaces of silica particles with a silane coupling agent having a cationic or anionic functional group in the case where the dispersion medium is an aqueous solution, or involves modifying the surfaces of silica particles with a silane coupling agent having a hydrophobic organic group in the case where the dispersion medium is an organic solvent.

For example, there has been disclosed a method for producing an organic solvent-dispersed silica sol, the method including a step of adding, to a hydrophilic inorganic oxide sol, a silicon alkoxide having two or more alkoxide groups bonded to a silicon atom, or a silicon alkoxide having one or more hydroxyl groups bonded to a silicon atom and one or more alkoxide groups bonded to a silicon atom, to thereby perform surface treatment, and a step of replacing the dispersion medium with a non-alcoholic organic solvent in the presence of a $C_{3\text{-}12}$ primary alcohol (see Patent Document 1).

There has also been disclosed a dispersion of surface-treated particles, the dispersion containing surface-treated particles in which a first organic silicon compound is bonded to the surfaces of metal oxide particles having a refractive index of 1.65 or more, a second organic silicon compound that is not bonded to the surfaces of the metal oxide particles, and an organic solvent, wherein the ratio of (the first organic silicon compound)/(the second organic silicon compound) is 0.1 to 9.0 (see Patent Document 2).

PRIOR ART DOCUMENTS

Patent Documents

Patent Document 1: JP 2005-200294 A
Patent Document 2: JP 2020-164374 A

SUMMARY OF THE INVENTION

Problems to be Solved by the Invention

The present invention provides a dispersion of silica-containing inorganic oxide particles (in particular, a dispersion of silica particles) exhibiting a high dispersion stability even at a high temperature or a high salt content.

Means for Solving the Problems

A first aspect of the present invention is a dispersion comprising, as a dispersoid, silane-bonded silica-containing inorganic oxide particles having surfaces modified with a hydrolyzable silane, and a liquid medium as a dispersion medium, wherein the dispersion medium contains a hydrolysate of the hydrolyzable silane; the ratio of (the number of moles of silicon atoms of the hydrolysate of the hydrolyzable silane in the dispersion medium)/(the number of moles of silicon atoms of the silane bonded to the surfaces of the inorganic oxide particles) is 0.2 to 30; and Q4 is greater than that before the surface modification with the silane, wherein Q4 corresponds to the case where the number of bridging oxygen atoms between silicon atoms of the silica particles is 4/2 per one silicon atom as determined by Si-NMR observation.

A second aspect of the present invention is the dispersion according to the first aspect, wherein the silica-containing inorganic oxide particles have an average particle diameter of 5 nm to 100 nm and are silica particles or particles of silica and at least one inorganic oxide selected from the group consisting of alumina, tin oxide, zirconium oxide, titanium oxide, and antimony oxide; and the silica-containing inorganic oxide particles are silica particles, particles of a composite metal oxide of silica and another metal oxide, or composite oxide particles having a core-shell structure of silica and another metal oxide.

A third aspect of the present invention is the dispersion according to the first or second aspect, wherein the hydrolyzable silane is at least one silane compound selected from the group consisting of silane compounds of the following Formulae (1) to (3):

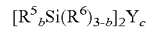

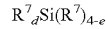

$$R^3{}_a Si(R^4)_{4-a} \qquad \text{Formula (1)}$$

$$[R^5{}_b Si(R^6)_{3-b}]_2 Y_c \qquad \text{Formula (2)}$$

$$R^7{}_d Si(R^8)_{4-e} \qquad \text{Formula (3)}$$

(in Formula (1), $R^3$ is an alkyl group, a halogenated alkyl group, an alkenyl group, or an organic group having an epoxy group, a (meth)acryloyl group, a mercapto group, an amino group, a ureido group, or a cyano group and is bonded to a silicon atom via an Si—C bond; $R^4$ is an alkoxy group, an acyloxy group, or a halogen group; and a is an integer of 1 to 3; and in Formulae (2) and (3), $R^5$ and R' are each a $C_{1\text{-}3}$ alkyl group and bonded to a silicon atom via an Si—C bond; $R^6$ and $R^8$ are each an alkoxy group, an acyloxy group, or a halogen group; Y is an alkylene group, an NH group, or an oxygen atom; at least one of $R^5$ and R' is a $C_{1\text{-}3}$ alkyl group and bonded to a silicon atom via an Si—C bond; b is an integer of 1 to 3; c is an integer of 0 or 1; d is an integer of 1 to 3; and e is an integer of 1 to 3).

A fourth aspect of the present invention is the dispersion according to the third aspect, wherein, in the hydrolysate of the hydrolyzable silane contained in the dispersion medium, the hydrolysate of a silane compound of Formula (1) wherein a is an integer of 1 contains a silane compound exhibiting a specific (T2+T3)/(T0+T1) ratio of 2 to 15 or a specific (T1+T2+T3)/(T0) ratio of 5 to 100 wherein T0, T1, T2, and T3 respectively correspond to structures such that the number of bridging oxygen atoms between silicon atoms is 0/2, 1/2, 2/2, and 3/2 per one silicon atom as determined by Si-NMR observation.

A fifth aspect of the present invention is the dispersion according to the third aspect, wherein, in the hydrolysate of the hydrolyzable silane contained in the dispersion medium, the hydrolysate of a silane compound of Formula (1) wherein a is an integer of 2 contains a silane compound exhibiting a (D1+D2)/(D0) ratio of 0.1 to 10 or a (D2)/(D0+D1) ratio of 0.01 to 10 wherein D0, D1, and D2 respectively correspond to structures such that the number of bridging oxygen atoms between silicon atoms is 0/2, 1/2, and 2/2 per one silicon atom as determined by Si-NMR observation.

A sixth aspect of the present invention is the dispersion according to any one of the first to fifth aspects, wherein the quotient obtained by dividing the amount of water vapor adsorbed on the silica-containing inorganic oxide particles by the amount of nitrogen gas adsorbed thereon; i.e., the ratio (specific surface area calculated from the amount of adsorbed water vapor)/(specific surface area calculated from the amount of adsorbed nitrogen gas) is 0.15 to 0.95 relative to that of silica particles before addition of the silane compound.

A seventh aspect of the present invention is a production method for the dispersion according to any one of the first to sixth aspects, the production method comprising the following steps (A) and (B):

step (A): a step of preparing an aqueous dispersion of the silica-containing inorganic oxide particles; and step (B): a step of adding a hydrolyzable silane to the aqueous dispersion of the silica-containing inorganic oxide particles at a pH of 2.0 to 6.5 so that the amount of the silane per surface area of the particles is 0.3 to 100 molecules/nm$^2$, stirring the resultant mixture at room temperature and then heating the mixture to a temperature of 50 to 99° C., and stirring the heated mixture for a period that is one to seven times the stirring period at room temperature.

An eighth aspect of the present invention is the production method according to the seventh aspect for producing a dispersion in an organic solvent as a dispersion medium, wherein the production method further comprises the following step (C) after the step (B):

step (C): a step of replacing the aqueous medium of the dispersion prepared in the step (B) with an organic solvent.

Effects of the Invention

A dispersion of silica-containing inorganic oxide particles (in particular, inorganic particles of silica, etc.) ensures dispersion stability by the repulsion between particles. In the case of, for example, silica particles, repulsion occurs between the silica particles because of the negative charge of silanol groups present on the surfaces of the particles. The absolute value of the charge varies depending on the pH of the dispersion or the type of a salt contained in the dispersion. Some types of surface-treated particles are less likely to be affected by the pH or the salt. In a surface treatment method for silica particles, for example, the surfaces of silica particles are treated with a hydrolyzable silane compound having a cationic functional group having a positive charge, or the surfaces of silica particles are treated with a hydrolyzable silane compound having an anionic functional group having a negative charge. Such a method utilizes the repulsion between the particles caused by the electrical repulsion between cationic or anionic functional groups.

Depending on the density of the aforementioned functional groups bonded to the surfaces of the silica particles, it is difficult to modify the entire surfaces of the particles with the aforementioned functional groups. Thus, the repulsion between the particles is not necessarily sufficient depending on pH conditions or salt concentration conditions.

When a silane compound having a functional group is added to a dispersion of silica particles, some molecules of the functional group-containing silane are bonded to the surfaces of the silica particles (hereinafter the molecules of the silane will be referred to as "bonded silane"), and the other molecules of the functional group-containing silane are not bonded to the silica particles, but are dissolved in the dispersion medium (hereinafter the molecules of the silane will be referred to as "free silane"). In the dispersion medium, the molecules of the functional group-containing silane are present between the silica particles. The repulsion occurs between the bonded silane molecules and the free silane molecules, since these silane molecules have the same functional group. Thus, the dispersion of the silica particles exhibits a high dispersion stability, since the repulsion occurs not only between the particles, but also between the silane monomer molecules.

The present inventors have found that the dispersion of the silica particles exhibits a high dispersion stability when the ratio of (the number of moles of silicon atoms of the hydrolysate of the hydrolyzable silane in the dispersion medium)/(the number of moles of silicon atoms of the silane bonded to the surfaces of the inorganic oxide particles) is a specific value (0.2 to 30).

In the case where the dispersion medium is an organic solvent, when the silanol groups of the silica particles, which have silanol-based hydrophilicity (i.e., different affinity to the organic solvent), are surface-treated with a silane having a hydrophobic functional group, the resultant silica particles exhibit a high compatibility with the organic solvent. It is difficult to modify the entire surfaces of the particles with the silane having the hydrophobic functional group. However, when the compatibility of a portion of the silica particles not modified with the hydrophobic functional group is secured by the silane monomer having the hydrophobic functional group, the particles can achieve a high dispersibility in the organic solvent of the dispersion.

In the present invention, preferably, the hydrolysate of the hydrolyzable silane is delocalized throughout the dispersion medium, due to the repulsion between the silica particles and the silane monomer molecules. Thus, preferably, extreme aggregation of free silane molecules does not proceed. For example, when a hydrolyzable silane having three hydrolyzable groups is used, the hydrolysate of the silane compound preferably exhibits a specific (T2+T3)/(T0+T1) ratio of 2 to 15 (preferably 2 to 10) or a specific (T1+T2+T3)/(T0) ratio of 5 to 100 (preferably 5 to 50) wherein T0, T1, T2, and T3 respectively correspond to structures such that the number of bridging oxygen atoms between silicon atoms is 0/2, 1/2, 2/2, and 3/2 per one silicon atom as determined by Si-NMR observation. Although either of these ratios may be satisfied, both of these ratios are preferably satisfied.

When a hydrolyzable silane having two hydrolyzable groups is used, the hydrolysate of the silane compound preferably exhibits a specific (D1+D2)/(D0) ratio of 0.1 to 10 or a specific (D2)/(D0+D1) ratio of 0.01 to 10 wherein D0, D1, and D2 respectively correspond to structures such that the number of bridging oxygen atoms between silicon atoms is 0/2, 1/2, and 2/2 per one silicon atom as determined by Si-NMR observation. Although either of these ratios may be satisfied, both of these ratios are preferably satisfied.

In the present invention, the quotient obtained by dividing the amount of water vapor adsorbed on the silica-containing inorganic oxide particles (in particular, the silica particles) by the amount of nitrogen gas adsorbed thereon; i.e., the ratio (specific surface area calculated from the amount of adsorbed water vapor)/(specific surface area calculated from the amount of adsorbed nitrogen gas) is 0.15 to 0.95 relative to that of the silica particles before addition of the silane compound. Thus, the inorganic oxide particles can achieve a high compatibility with various media, including an aqueous medium and an organic solvent.

In the dispersion of the silica particles satisfying the aforementioned conditions of bonded silane and free silane, Q4 is greater than that before the surface modification with the silane, wherein Q4 corresponds to the case where the number of bridging oxygen atoms between silicon atoms of the silica particles is 4/2 per one silicon atom as determined by Si-NMR observation. For example, an increase in Q4 may be 1.01 to 1.5 or 1.01 to 1.15.

MODES FOR CARRYING OUT THE INVENTION

The present invention is directed to a dispersion containing, as a dispersoid, silane-bonded silica-containing inorganic oxide particles having surfaces modified with a hydrolyzable silane, and a liquid medium as a dispersion medium, wherein the dispersion medium contains a hydrolysate of the hydrolyzable silane; the ratio of (the number of moles of silicon atoms of the hydrolysate of the hydrolyzable silane in the dispersion medium)/(the number of moles of silicon atoms of the silane bonded to the surfaces of the inorganic oxide particles) is 0.2 to 30, preferably 0.2 to 15; and Q4 is greater than that before the surface modification with the silane, wherein Q4 corresponds to the case where the number of bridging oxygen atoms between silicon atoms of the silica particles is 4/2 per one silicon atom as determined by Si-NMR observation.

Unless otherwise specified, the average particle diameter of the inorganic substance used in the present invention, for example, an aqueous silica sol (colloidal silica particles) refers to a specific surface area diameter determined by the nitrogen adsorption method (BET method). The specific surface area diameter (average particle diameter (specific surface area diameter) D (nm)) determined by the nitrogen adsorption method (BET method) is obtained by the following formula: D (nm)=2,720/S from the specific surface area S ($m^2$/g) measured by the nitrogen adsorption method. The silica-containing inorganic oxide particles have an average particle diameter of 5 nm to 100 nm, preferably 5 to 60 nm as determined by the BET method, and are silica particles or particles of silica and at least one inorganic oxide selected from the group consisting of alumina, tin oxide, zirconium oxide, titanium oxide, and antimony oxide. The silica-containing inorganic oxide particles are, for example, silica particles, particles of a composite metal oxide of silica and another metal oxide, or composite oxide particles having a core-shell structure of silica and another metal oxide. For example, the particles of a single metal oxide are preferably silica particles, and the particles of a composite metal oxide are particles of a composite metal oxide of silica and alumina or particles of a composite metal oxide of tin oxide and silica. The composite oxide particles having a core-shell structure are, for example, composite oxide particles having a core-shell structure wherein the core is formed of titanium oxide alone or both titanium oxide and zirconium oxide, and the shell is formed of tin oxide and silica.

In the dispersion of the present invention, the aforementioned silica-containing inorganic oxide particles are dispersed in a dispersion medium at a concentration of, for example, 1 to 50% by mass.

The production method for the dispersion of the present invention includes the following steps (A) and (B):
step (A): a step of preparing an aqueous dispersion of the silica-containing inorganic oxide particles; and
step (B): a step of adding a hydrolyzable silane to the aqueous dispersion of the silica-containing inorganic oxide particles at a pH of 2.0 to 6.5 so that the amount of the silane per surface area of the particles is 0.3 to 100 molecules/$nm^2$, stirring the resultant mixture at room temperature and then heating the mixture to a temperature of 50 to 99° C., and stirring the heated mixture for a period that is one to seven times the stirring period at room temperature.

In the aqueous dispersion of the silica-containing inorganic oxide particles prepared in the step (A), the silica-containing inorganic oxide particles are dispersed in the aqueous medium at a concentration of, for example, 1 to 50% by mass. For example, an aqueous silica sol is prepared through step a) of producing activated silica by cation exchange of liquid glass serving as a starting material, and step b) of heating the activated silica to thereby yield silica particles. In the step a), a mineral acid (e.g., hydrochloric acid, nitric acid, or sulfuric acid) may be added for increasing the purity of activated silica to thereby elute metal impurities other than silica, and then metal impurities and unnecessary anions may be removed by cation exchange and anion exchange. In the step b), an alkaline component (e.g., NaOH or KOH) is added to the activated silica to thereby grow silica particles. In order to promote the growth of silica particles, a seed liquid is prepared by addition of an alkali to the activated silica produced in the step a), and a feed liquid is prepared. While the seed liquid is heated, the feed liquid is added to the seed liquid for increasing the silica particle diameter. Thus, an aqueous silica sol having an intended particle diameter can be produced.

In the step (B), the pH of the aqueous dispersion of the silica-containing inorganic oxide particles prepared in the step (A) may be adjusted to 2.0 to 6.5, followed by addition of a hydrolyzable silane. The pH may be adjusted with an acid or an alkali.

Examples of the acid include mineral acids such as hydrochloric acid, sulfuric acid, and nitric acid; and organic acids such as formic acid, oxalic acid, citric acid, acetic acid, lactic acid, malic acid, succinic acid, tartaric acid, butyric acid, fumaric acid, propionic acid, and ascorbic acid.

Examples of the alkali include ammonia, an amine, a quaternary ammonium hydroxide, an alkali metal hydroxide, an alkali metal alkoxide, and an aliphatic carboxylic acid alkali metal salt.

Examples of the amine include a primary amine, a secondary amine, and a tertiary amine.

Examples of the primary amine include methylamine, ethylamine, n-propylamine, and i-propylamine.

Examples of the secondary amine include ethyl-n-propylamine, ethyl-1-propylamine, dipropylamine, di-i-propylamine, ethylbutylamine, n-propylbutylamine, dibutylamine, ethylpentylamine, n-propylpentylamine, i-propylpentylamine, dipentylamine, ethyloctylamine, i-propyloctylamine, butyloctylamine, and dioctylamine.

Examples of the aforementioned tertiary amine include triethylamine, ethyl-di-n-propylamine, diethyl-n-propylamine, tri-n-propylamine, tri-i-propylamine, ethyldibutylamine, diethylbutylamine, i-propyldibutylamine, di-i-propylbutylamine, tributylamine, ethyldipentylamine, diethylpentylamine, tripentylamine, methyldioctylamine, dimethyloctylamine, ethyldioctylamine, diethyloctylamine, and trioctylamine.

The quaternary ammonium hydroxide is preferably a tetraalkylammonium hydroxide having a total carbon atom number of 4 to 40. Examples of the tetraalkylammonium hydroxide include tetramethylammonium hydroxide, tetraethylammonium hydroxide, tetra-n-propylammonium hydroxide, tetra-i-propylammonium hydroxide, tetrabutylammonium hydroxide, and ethyltrimethylammonium hydroxide.

Examples of the alkali metal hydroxide include sodium hydroxide, potassium hydroxide, sodium carbonate, and potassium carbonate.

Examples of the alkali metal alkoxide include sodium methoxide, sodium ethoxide, potassium methoxide, and potassium ethoxide.

Examples of the aliphatic carboxylic acid alkali metal salt include a $C_{10-30}$ saturated aliphatic carboxylic acid alkali metal salt and a $C_{10-30}$ unsaturated aliphatic carboxylic acid alkali metal salt. Examples of the alkali metal include sodium and potassium. Examples of the saturated aliphatic carboxylic acid alkali metal salt include alkali metal laurate, alkali metal myristate, alkali metal palmitate, and alkali metal stearate.

Examples of the unsaturated aliphatic carboxylic acid alkali metal salt include alkali metal oleate, alkali metal linoleate, and alkali metal linolenate.

The hydrolyzable silane used in the step (B) may be at least one silane compound selected from the group consisting of silane compounds of Formulae (1) to (3).

In Formula (1), $R^3$ is an alkyl group, a halogenated alkyl group, an alkenyl group, or an organic group having an epoxy group, a (meth)acryloyl group, a mercapto group, an amino group, a ureido group, or a cyano group and is bonded to a silicon atom via an Si—C bond; $R^4$ is an alkoxy group, an acyloxy group, or a halogen group; and a is an integer of 1 to 3.

In Formulae (2) and (3), $R^5$ and $R^7$ are each a $C_{1-3}$ alkyl group and bonded to a silicon atom via an Si—C bond; $R^6$ and $R^8$ are each an alkoxy group, an acyloxy group, or a halogen group; Y is an alkylene group, an NH group, or an oxygen atom; at least one of $R^5$ and $R^7$ is a $C_{1-3}$ alkyl group and bonded to a silicon atom via an Si—C bond; b is an integer of 1 to 3; c is an integer of 0 or 1; d is an integer of 1 to 3; and e is an integer of 1 to 3.

Examples of the aforementioned alkyl group include, but are not limited to, $C_{1-18}$ alkyl groups, such as methyl group, ethyl group, n-propyl group, i-propyl group, cyclopropyl group, n-butyl group, i-butyl group, s-butyl group, t-butyl group, cyclobutyl group, 1-methyl-cyclopropyl group, 2-methyl-cyclopropyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group and 2-ethyl-3-methyl-cyclopropyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. Examples of the alkylene group include alkylene groups derived from the above-exemplified alkyl groups.

Examples of the alkenyl group include, but are not limited to, $C_{2-10}$ alkenyl groups, such as ethenyl group, 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 2-pentenyl group, 3-pentenyl group, 4-pentenyl group, 1-n-propylethenyl group, 1-methyl-1-butenyl group, 1-methyl-2-butenyl group, 1-methyl-3-butenyl group, 2-ethyl-2-propenyl group, 2-methyl-1-butenyl group, 2-methyl-2-butenyl group, 2-methyl-3-butenyl group, 3-methyl-1-butenyl group, 3-methyl-2-butenyl group, 3-methyl-3-butenyl group, 1,1-dimethyl-2-propenyl group, 1-i-propylethenyl group, 1,2-dimethyl-1-propenyl group, 1,2-dimethyl-2-propenyl group, 1-cyclopentenyl group, 2-cyclopentenyl group, 3-cyclopentenyl group, 1-hexenyl group, 2-hexenyl group, 3-hexenyl group, 4-hexenyl group, 5-hexenyl group, 1-methyl-1-pentenyl group, 1-methyl-2-pentenyl group, 1-methyl-3-pentenyl group, 1-methyl-4-pentenyl group, 1-n-butylethenyl group, 2-methyl-1-pentenyl group, and 2-methyl-2-pentenyl group.

Examples of the aforementioned alkoxy group include, but are not limited to, $C_{1-10}$ alkoxy groups, such as methoxy group, ethoxy group, n-propoxy group, i-propoxy group, n-butoxy group, i-butoxy group, s-butoxy group, t-butoxy group, n-pentyloxy group, 1-methyl-n-butoxy group, 2-methyl-n-butoxy group, 3-methyl-n-butoxy group, 1,1-dimethyl-n-propoxy group, 1,2-dimethyl-n-propoxy group, 2,2-dimethyl-n-propoxy group, 1-ethyl-n-propoxy group, and n-hexyloxy group.

Examples of the aforementioned acyloxy group include, but are not limited to, $C_{2-10}$ acyloxy groups, such as methylcarbonyloxy group, ethylcarbonyloxy group, n-propylcarbonyloxy group, i-propylcarbonyloxy group, n-butylcarbonyloxy group, i-butylcarbonyloxy group, s-butylcarbonyloxy group, t-butylcarbonyloxy group, n-pentylcarbonyloxy group, 1-methyl-n-butylcarbonyloxy group, 2-methyl-n-butylcarbonyloxy group, 3-methyl-n-butylcarbonyloxy group, 1,1-dimethyl-n-propylcarbonyloxy group, 1,2-dimethyl-n-propylcarbonyloxy group, 2,2-dimethyl-n-propylcarbonyloxy group, 1-ethyl-n-propylcarbonyloxy group, n-hexylcarbonyloxy group, 1-methyl-n-pentylcarbonyloxy group, and 2-methyl-n-pentylcarbonyloxy group.

Examples of the aforementioned halogen group include fluorine, chlorine, bromine, and iodine.

The aforementioned (meth)acryloyl group refers to both an acryloyl group and a methacryloyl group.

The compounds of Formulae (2) and (3) are preferably compounds capable of forming a trimethylsilyl group on the surfaces of silica particles.

The compounds may be exemplified below.

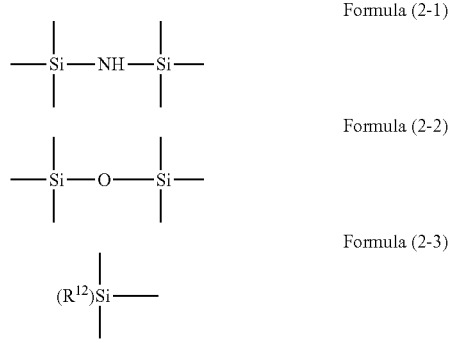

Formula (2-1)

Formula (2-2)

Formula (2-3)

In the aforementioned formulae, $R^{12}$ is an alkoxy group such as a methoxy group or an ethoxy group.

This step involves coating of the surfaces of silica particles with the aforementioned silane compound via siloxane bonds through reaction between hydroxyl groups (e.g., silanol groups) on the surfaces of silica particles and the silane compound.

The reaction may be performed at a temperature falling within a range of 20° C. to the boiling point of the dispersion medium, for example, at a temperature falling within a range of 20° C. to 100° C. The reaction may be performed for about 0.1 to 6 hours.

The functional group is preferably, for example, an amino group, an epoxy group, an alkyl group, or a phenyl group. Examples of the functional group include aminopropyl group, aminoethylaminopropyl group, methyl group, phenyl group, glycidoxypropyl group, epoxycyclohexylethyl group, and trifluoropropyl group.

Examples of the silane compound corresponding to such a functional group include aminopropyltrimethoxysilane, aminopropyltriethoxysilane, aminoethylaminopropyltrimethoxysilane, aminoethylaminopropyltriethoxysilane, aminoethylaminopropylmethyldimethoxysilane, aminoethylaminopropylmethyldiethoxysilane, methyltrimethoxysilane, methyltriethoxysilane, phenyltrimethoxysilane, phenyltriethoxysilane, glycidoxypropyltrimethoxysilane, glycidoxypropyltriethoxysilane, epoxycyclohexylethyltrimethoxysilane, epoxycyclohexylethyltriethoxysilane, trifluoropropyltrimethoxysilane, and trifluoropropyltriethoxysilane.

The surfaces of silica particles may be coated with the aforementioned silane compound by adding the silane compound to the silica sol in such an amount that the number of silicon atoms in the silane compound corresponds to a coating amount of $0.1/nm^2$ to $4.0/nm^2$.

The hydrolysis of the aforementioned silane compound requires water. In the case of an aqueous solvent sol, the aqueous solvent is used for the hydrolysis.

The hydrolysis may be performed with or without use of a catalyst.

When the hydrolysis is performed without use of a catalyst, the surfaces of silica particles serve as a catalyst, and a silica sol having a pH of 2.0 to 6.5 may be used.

When a catalyst is used for the hydrolysis, the hydrolysis catalyst may be a metal chelate compound, an organic acid, an inorganic acid, an organic base, or an inorganic base. Examples of the metal chelate compound serving as a hydrolysis catalyst include triethoxy·mono(acetylacetonato) titanium and triethoxy·mono(acetylacetonato)zirconium. Examples of the organic acid serving as a hydrolysis catalyst include acetic acid and oxalic acid. Examples of the inorganic acid serving as a hydrolysis catalyst include hydrochloric acid, nitric acid, sulfuric acid, hydrofluoric acid, and phosphoric acid. Examples of the organic base serving as a hydrolysis catalyst include pyridine, pyrrole, piperazine, and quaternary ammonium salt. Examples of the inorganic base serving as a hydrolysis catalyst include ammonia, sodium hydroxide, and potassium hydroxide.

In the aforementioned step (B), a hydrolyzable silane is added to the aqueous dispersion of the inorganic oxide particles prepared in the step (A). The resultant mixture is stirred at room temperature (e.g., about 15 to 25° C.) for 0.01 to 2 hours, and then the mixture is heated to a temperature of 50 to 99° C. and stirred for 0.01 to 14 hours. The stirring period after heating to 50 to 99° C. is preferably 1 to 100 times or 1 to 7 times the stirring period at room temperature. When the ratio of the stirring period after heating to that at room temperature is 1 time or less, the inorganic oxide particles (e.g., silica particles) are insufficiently coated with the hydrolysate of the hydrolyzable silane, and the particles are locally coated later with the silane compound present in the dispersion medium; i.e., uniform coating fails to be achieved. Meanwhile, when the ratio of the stirring period after heating to that at room temperature is 7 times or more, the amounts of the T1, T2, T3, D1, and D2 structures are reduced, which is not preferred in view of particle repulsion.

In the present invention, the state where the hydrolysate of the hydrolyzable silane is bonded to the silica particles coexists with the state where the hydrolysate of the hydrolyzable silane is present in the dispersion medium. Both these states contribute to the stability of the inorganic oxide sol (silica sol) when the ratio of (the number of moles of silicon atoms of the hydrolysate of the hydrolyzable silane in the dispersion medium)/(the number of moles of silicon atoms of the silane bonded to the surfaces of the inorganic oxide particles) is 0.2 to 30.

In the present invention, in the state where the hydrolysate of the hydrolyzable silane is bonded to the silica particles, the silica particles have reduced amount silanol, which is characterized in that Q4 is greater than that before the surface modification with the silane, wherein Q4 corresponds to the case where the number of bridging oxygen atoms between silicon atoms of the silica particles is 4/2 per one silicon atom as determined by Si-NMR observation.

In the state where the hydrolysate of the hydrolyzable silane is bonded to the silica particles, the quotient obtained by dividing the specific surface area calculated from the amount of water vapor adsorbed on the silica particles by the specific surface area calculated from the amount of nitrogen gas adsorbed thereon; i.e., the ratio (specific surface area calculated from the amount of adsorbed water vapor)/(specific surface area calculated from the amount of adsorbed nitrogen gas) is 0.15 to 0.95 relative to that of the silica particles before addition of the silane compound.

This numerical value indicates that the silanol groups on the silica particle surfaces are replaced with the silane compound having a functional group.

In the hydrolysate of the hydrolyzable silane contained in the dispersion medium, the hydrolysate of a silane compound of Formula (1) wherein a is an integer of 1 is characterized by containing a silane compound exhibiting a (T2+T3)/(T0+T1) ratio of 2 to 10 or a (T1+T2+T3)/(T0) ratio of 5 to 100 wherein T0, T1, T2, and T3 respectively correspond to structures such that the number of bridging oxygen atoms between silicon atoms is 0/2, 1/2, 2/2, and 3/2 per one silicon atom as determined by Si-NMR observation. Although either of these ratios may be satisfied, both of these ratios are preferably satisfied.

In the hydrolysate of the hydrolyzable silane contained in the dispersion medium, the hydrolysate of a silane compound of Formula (1) wherein a is an integer of 2 is characterized by containing a silane compound exhibiting a (D1+D2)/(D0) ratio of 0.1 to 10 or a (D2)/(D0+D1) ratio of 0.01 to 10 wherein D0, D1, and D2 respectively correspond to structures such that the number of bridging oxygen atoms between silicon atoms is 0/2, 1/2, and 2/2 per one silicon atom as determined by Si-NMR observation. Although either of these ratios may be satisfied, both of these ratios are preferably satisfied.

The thus-produced dispersion of the present invention is formed into a dispersion containing an organic solvent as the dispersion medium by the method further including the following step (C) after the step (B):

step (C): a step of replacing the aqueous medium of the dispersion prepared in the step (B) with the organic solvent.

Examples of the organic solvent include organic solvents such as an alcohol, a ketone, an ether, an ester, an amide, and a hydrocarbon. Examples of the alcohol include $C_{1-10}$ alcohols, such as methanol, ethanol, i-propanol, n-propanol, and butanol. Examples of the ketone include linear or cyclic aliphatic ketones having a carbon atom number of 3 to 30, such as methyl ethyl ketone, diethyl ketone, methyl propyl ketone, methyl isobutyl ketone, diisobutyl ketone, methyl amyl ketone, and cyclohexanone. Examples of the ether include linear or cyclic aliphatic ethers having a carbon atom number of 3 to 30, such as diethyl ether and tetrahydrofuran. Examples of the ester include linear or cyclic esters having a carbon atom number of 2 to 30, such as ethyl acetate, butyl acetate, sec-butyl acetate, methoxybutyl acetate, amyl acetate, n-propyl acetate, i-propyl acetate, ethyl lactate, butyl lactate, ethylene glycol monomethyl ether acetate, propylene glycol monomethyl ether acetate, propylene glycol monoethyl ether acetate, propylene glycol monopropyl ether acetate, phenyl acetate, phenyl lactate, and phenyl propionate. Examples of the amide include $C_{3-30}$ aliphatic amides, such as dimethylacetamide, dimethylformamide, N-methylpyrrolidone, and N-ethylpyrrolidone. Examples of the hydrocarbon include linear or cyclic aliphatic or aromatic hydrocarbons having a carbon atom number of 6 to 30, such as hexane, heptane, octane, nonane, decane, benzene, toluene, and xylene.

The silica-containing inorganic oxide sol (e.g., silica sol) of the present invention can be used for various applications, including a high-salt-content dispersion medium sol, an adhesive, a release agent, a semiconductor encapsulant, an LED encapsulant, a paint, a film additive, a hard coating agent, a photoresist material, a printing ink, a cleaning agent, a cleaner, an additive for various resins, an insulating composition, an antirust agent, a lubricating oil, a metal working oil, a coating agent for film, a peeling agent, and a well treatment agent.

EXAMPLES (Measuring Apparatus)

The apparatuses described below were used for analysis of an aqueous silica sol (pH, electrical conductivity, viscosity, DLS average particle diameter, and amount of bonded silane), and analysis of a sample prepared from the aqueous silica sol after a room-temperature salt resistance test or a high-temperature salt resistance test.

DLS average particle diameter (average particle diameter by dynamic light scattering): measured with a dynamic light scattering particle diameter measuring apparatus Zetasizer Nano (available from Spectris Co., Ltd., Malvern Panalytical).

pH: measured with a pH meter (available from DKK-TOA CORPORATION).

Electrical conductivity: measured with an electrical conductivity meter (available from DKK-TOA CORPORATION).

Viscosity: measured with a BMII type viscometer (available from TOKYO KEIKI INC.).

Amount of bonded silane: measured with an organic elemental analyzer CHNS/O Analyzer (available from PerkinElmer Japan G.K.) or a TN measuring apparatus TN-2100V Total Nitrogen Analyzer (available from Mitsubishi Chemical Analytech Co., Ltd.).

Si-NMR: measured with AVANCE NEO (available from Bruker).

Amount of adsorbed nitrogen gas: measured with MONOSORB (available from Quantachrome INSTRUMENTS).

Amount of adsorbed water vapor: measured with Q5000SA Sorption Analyzer (available from TA Instruments Japan Inc.).

[Evaluation of Silica Sol]

(Removal of Silane Not Bonded to Silica Particles (Free Silane))

2 g of an aqueous silica sol and 4 g of pure water were added to 15-mL centrifugal filter unit (trade name: Amicon Ultra-15, available from Merck), and the resultant mixture was subjected to centrifugal treatment at a centrifugal force of 2,770 G for 20 minutes. After the centrifugal treatment, the liquid discharged to the lower portion of the unit was discarded, and pure water (in a mass equal to that of the discarded liquid) was added to the aqueous silica sol concentrated at the upper portion of the filter for redispersion of the silica sol. Thereafter, the resultant dispersion was again subjected to centrifugal treatment at a centrifugal force of 2,770 G for 20 minutes. The aforementioned operation was repeated four times in total, to thereby prepare a free-silane-removed aqueous silica sol.

(Measurement of Carbon Content)

The free-silane-removed aqueous silica sol was dried under heating at 100° C., and the dried product was pulverized with a mortar, to thereby yield silica sol powder. The carbon content of the resultant silica sol powder was measured with the organic elemental analyzer, and the amount of bonded silane was calculated from the measured carbon content by using the following formula.

$$\text{Surface treatment amount} = (Cm \div Cn \div Sc \times A)/(Ct \times Cs)$$

In the formula, Cm is the carbon content, Cn is the molecular weight of carbon, Sc is the number of carbon atoms in the silane, A is Avogadro's number, Ct is the mass of silica particles, and Cs is the specific surface area of silica.

The unit of the amount of bonded silane determined by measurement of the carbon content is (molecules/nm$^2$).

(Measurement of Nitrogen Content)

The nitrogen content of the free-silane-removed aqueous silica sol was measured with the TN measuring apparatus, and the amount of bonded silane was calculated from the measured nitrogen content by using the following formula.

$$\text{Surface treatment amount} = (Nm \div Nn \div Sn \times A)/(Ct \times Cs)$$

In the formula, Nm is the nitrogen content, Nn is the molecular weight of nitrogen, Sn is the number of nitrogen atoms in the silane, A is Avogadro's number, Ct is the mass of silica particles, and Cs is the specific surface area of silica.

The unit of the amount of bonded silane determined by measurement of the nitrogen content is (molecules/nm$^2$).

(Measurement of Amount of Adsorbed Water Vapor)

The aforementioned aqueous silica sol prepared by the removal of free silane was dried on a hot plate at 80° C., and the resultant silica gel was pulverized with a mortar. Thereafter, the pulverized product was further dried at 150° C. for three hours, to thereby yield silica dry powder. The specific surface area (m$^2$/g) of the powder was determined by the water vapor adsorption method based on the BET theory (water vapor BET method).

(Measurement of Amount of Adsorbed Nitrogen Gas)

The aforementioned aqueous silica sol prepared by the removal of free silane was dried on a hot plate at 80° C., and the resultant silica gel was pulverized with a mortar. Thereafter, the pulverized product was further dried at 150° C. for three hours, to thereby yield silica dry powder. The specific surface area (m$^2$/g) of the powder was determined by the nitrogen adsorption method based on the BET theory (BET method; i.e., nitrogen gas BET method).

(Evaluation of Salt Resistance)

(Preparation of Salt Resistance Test Sample)

A stirring bar was added to a 200-mL styrol bottle, and then 3.6 g of each of the silica sols produced in Examples or Comparative Examples was added, followed by stirring with a magnetic stirrer. While the silica sol was stirred with the magnetic stirrer, 46.4 g of pure water and 100 g of a brine solution having a salt concentration of 6% by mass were added to the silica sol, and the mixture was stirred for one hour. The resultant mixture was used as a salt resistance test sample for evaluation of heat resistance and salt resistance when the silica concentration of the silica sol was adjusted to 0.5% by mass at a salt concentration of 4% by mass. The salt resistance test sample was evaluated for pH, electrical conductivity, and the DLS average particle diameter of the aqueous silica sol (silica particles) contained in the sample.

(Room-Temperature Salt Resistance Evaluation)

A 200-mL styrol-made sealable container was charged with 150 g of the aforementioned salt resistance test sample. After being sealed, the styrol container was allowed to stand still at 20° C., and then maintained for a predetermined period of time. Thereafter, the salt resistance test sample was evaluated for appearance, pH, electrical conductivity, and the DLS average particle diameter of the aqueous silica sol (silica particles) contained in the sample.

The salt resistance was evaluated after the sample was maintained at 20° C. for a predetermined period of time (after the elapse of 10 hours). Specifically, the salt resistance was determined on the basis of the results of measurement of the DLS average particle diameter of the aqueous silica sol (silica particles) contained in the sample (see the determination of the salt resistance below) as well as evaluation of the appearance of the sample.

(Determination of Salt Resistance)

A: The ratio of the DLS average particle diameter after the salt resistance test/the DLS average particle diameter before the test is 1.1 or less.

B: The ratio of the DLS average particle diameter after the salt resistance test/the DLS average particle diameter before the test is 1.2 to 1.5.

C: The ratio of the DLS average particle diameter after the salt resistance test/the DLS average particle diameter before the test is 1.6 to 2.4.

D: The ratio of the DLS average particle diameter after the salt resistance test/the DLS average particle diameter before the test is 2.5 to 20.0.

E: The ratio of the DLS average particle diameter after the salt resistance test/the DLS average particle diameter before the test is 20.1 or more, or white turbid and solid-liquid separation.

The results of the salt resistance test indicate that A is the most preferred, and B, C, D, and E are preferred in this order.

(High-Temperature Salt Resistance Evaluation-1)

A 120-mL Teflon (registered trademark)-made sealable container was charged with 65 g of the aforementioned salt resistance test sample. After being sealed, the Teflon (registered trademark) container was placed in a dryer at 100° C., and then maintained at 100° C. for a predetermined period of time (10 hours). Thereafter, the salt resistance test sample was evaluated for appearance, pH, electrical conductivity, and the DLS average particle diameter of the aqueous silica sol (silica particles) contained in the sample. The high-temperature salt resistance was determined on the basis of the same criteria as those used for evaluation of the aforementioned room-temperature salt resistance (determination of the salt resistance).

(High-Temperature Salt Resistance Evaluation-2)

The high-temperature salt resistance was determined through the same operation as in (High-Temperature Salt Resistance Evaluation-1) described above, except that the temperature of the dryer was set to 120° C., and the maintenance time was adjusted to 10 hours.

(Preparation of Aqueous Silica Sol)

Example 1

A 2,000-mL glass-made eggplant-shaped flask was charged with 1,000 g of an aqueous silica sol (SNOWTEX (trade name) ST-O available from Nissan Chemical Corporation, silica concentration: 20.5% by mass, average particle diameter by the BET method: 11.7 nm, average particle diameter by the DLS method: 18.6 nm) and a magnetic stirring bar. Thereafter, while the aqueous silica sol was stirred with a magnetic stirrer, 9.4 g of 3-glycidoxypropyltrimethoxysilane (Dynasylan GLYMO, available from Evonik) was added to the aqueous silica sol so that the amount of the silane compound relative to the surface area of the silica in the aqueous silica sol was 0.5 molecules/nm$^2$. Subsequently, a cooling tube through which tap water flowed was provided on an upper portion of the eggplant-shaped flask, and the aqueous sol was heated to 60° C. under reflux. The aqueous sol was maintained at 60° C. for four hours (including the temperature increasing period) and then cooled. The aqueous sol heated to 60° C. was stirred for a period that was one to seven times the stirring period at room temperature. After being cooled to room temperature, the aqueous sol was removed from the flask, to thereby produce 1,009.4 g of an aqueous sol containing an aqueous silica sol subjected to surface treatment with the silane compound.

The aqueous silica sol of Example 1 was evaluated for pH, electrical conductivity, viscosity, and average particle diameter by the DLS method.

The amount of bonded silane in the aqueous silica sol of Example 1 was evaluated according to (Evaluation of Amount of Bonded Silane).

A salt resistance test sample was prepared according to <Preparation of Salt Resistance Test Sample>, and the sample was maintained at 20° C. for 10 hours according to <Room-Temperature Salt Resistance Evaluation>, followed by evaluation of the room-temperature salt resistance of the sample removed from the container.

Example 2

The same operation as in Example 1 was performed, except that 149.7 g of 3-glycidoxypropyltrimethoxysilane (Dynasylan GLYMO, available from Evonik) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 8.0 molecules/nm$^2$, to thereby produce 1,149.7 g of an aqueous sol.

The aqueous silica sol of Example 2 was evaluated for pH, electrical conductivity, viscosity, and average particle diameter by the DLS method.

The amount of bonded silane in the aqueous silica sol of Example 2 was evaluated according to (Evaluation of Amount of Bonded Silane).

A salt resistance test sample was prepared according to (Preparation of Salt Resistance Test Sample), and the sample was maintained at 100° C. for 10 hours according to (High-Temperature Salt Resistance Evaluation-1), followed by evaluation of the high-temperature salt resistance of the sample removed from the container.

Example 3

The same operation as in Example 1 was performed, except that 576.2 g of 3-glycidoxypropyltrimethoxysilane (Dynasylan GLYMO, available from Evonik) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 30.8 molecules/nm$^2$, to thereby produce 1,576.2 g of an aqueous sol.

The aqueous silica sol of Example 3 was evaluated for pH, electrical conductivity, viscosity, and average particle diameter by the DLS method.

The amount of bonded silane in the aqueous silica sol of Example 3 was evaluated according to (Evaluation of Amount of Bonded Silane).

A salt resistance test sample was prepared according to (Preparation of Salt Resistance Test Sample), and the sample was maintained at 100° C. for 10 hours according to (High-Temperature Salt Resistance Evaluation-1), followed by evaluation of the high-temperature salt resistance of the sample removed from the container.

Example 4

The same operation as in Example 1 was performed, except that 864.3 g of 3-glycidoxypropyltrimethoxysilane (Dynasylan GLYMO, available from Evonik) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 46.2 molecules/nm$^2$, to thereby produce 1,864.3 g of an aqueous sol.

The aqueous silica sol of Example 4 was evaluated for pH, electrical conductivity, viscosity, and average particle diameter by the DLS method.

The amount of bonded silane in the aqueous silica sol of Example 4 was evaluated according to (Evaluation of Amount of Bonded Silane).

A salt resistance test sample was prepared according to (Preparation of Salt Resistance Test Sample), and the sample was maintained at 100° C. for 10 hours according to (High-Temperature Salt Resistance Evaluation-1), followed by evaluation of the high-temperature salt resistance of the sample removed from the container.

Example 5

The same operation as in Example 1 was performed, except that 5.4 g of methyltrimethoxysilane (KBM-13 available from Shin-Etsu Chemical Co., Ltd.) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 0.5 molecules/nm$^2$, to thereby produce 1,005.4 g of an aqueous sol.

The aqueous silica sol of Example 5 was evaluated for pH, electrical conductivity, viscosity, and average particle diameter by the DLS method.

The amount of bonded silane in the aqueous silica sol of Example 5 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Example 6

The same operation as in Example 1 was performed, except that 4.8 g of dimethyldimethoxysilane (KBM-22 available from Shin-Etsu Chemical Co., Ltd.) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 0.5 molecules/nm$^2$, to thereby produce 1,004.8 g of an aqueous sol.

The aqueous silica sol of Example 6 was evaluated for pH, electrical conductivity, viscosity, and average particle diameter by the DLS method.

The amount of bonded silane in the aqueous silica sol of Example 6 was evaluated according to (Evaluation of Amount of Bonded Silane).

A salt resistance test sample was prepared according to (Preparation of Salt Resistance Test Sample), and the sample was maintained at 20° C. for 10 hours according to (Room- Temperature Salt Resistance Evaluation), followed by evaluation of the room-temperature salt resistance of the sample removed from the container.

Example 7

The same operation as in Example 1 was performed, except that 9.8 g of 2-(3,4-epoxycyclohexyl)ethyltrimethoxysilane (KBM-303 available from Shin-Etsu Chemical Co., Ltd.) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 0.5 molecules/nm$^2$, to thereby produce 1,009.8 g of an aqueous sol.

The aqueous silica sol of Example 7 was evaluated for pH, electrical conductivity, viscosity, and average particle diameter by the DLS method.

The amount of bonded silane in the aqueous silica sol of Example 7 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Example 8

The same operation as in Example 1 was performed, except that 8.6 g of trifluoropropyltrimethoxysilane (KBM-7103 available from Shin-Etsu Chemical Co., Ltd.) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 0.5 molecules/nm$^2$, to thereby produce 1,008.6 g of an aqueous sol.

The aqueous silica sol of Example 8 was evaluated for pH, electrical conductivity, viscosity, and average particle diameter by the DLS method.

The amount of bonded silane in the aqueous silica sol of Example 8 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Example 9

The same operation as in Example 1 was performed, except that a liquid prepared by preliminarily mixing 114.1 g of lactic acid with 140.2 g of aminopropyltriethoxysilane (KBE-903 available from Shin-Etsu Chemical Co., Ltd.) and then stirring the mixture for 30 minutes was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 8.0 molecules/nm$^2$, to thereby produce 1,254.3 g of an aqueous sol.

The aqueous silica sol of Example 9 was evaluated for pH, electrical conductivity, viscosity, and average particle diameter by the DLS method.

The amount of bonded silane in the aqueous silica sol of Example 9 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Example 10

The same operation as in Example 1 was performed, except that 114.1 g of lactic acid was added to an aqueous silica sol (SNOWTEX (trade name) ST-O available from Nissan Chemical Corporation, average particle diameter by the BET method: 11.7 nm, average particle diameter by the DLS method: 18.6 nm) and the mixture was stirred with a magnetic stirrer, and 113.6 g of aminopropyltrimethoxysilane (KBM-903 available from Shin-Etsu Chemical Co., Ltd.) was added to the mixture so that the amount of the silane compound relative to the surface area of the silica in the aqueous silica sol was 8.0 molecules/nm$^2$, to thereby produce 1,227.7 g of an aqueous sol.

The aqueous silica sol of Example 10 was evaluated for pH, electrical conductivity, viscosity, and average particle diameter by the DLS method.

The amount of bonded silane in the aqueous silica sol of Example 10 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Example 11

The same operation as in Example 1 was performed, except that 228.2 g of lactic acid was added to an aqueous silica sol (SNOWTEX (trade name) ST-O available from Nissan Chemical Corporation, average particle diameter by the BET method: 11.7 nm, average particle diameter by the DLS method: 18.6 nm) and the mixture was stirred with a magnetic stirrer, and 140.9 g of aminoethylaminopropyltrimethoxysilane (KBM-603 available from Shin-Etsu Chemical Co., Ltd.) was added to the mixture so that the amount of the silane compound relative to the surface area of the silica in the aqueous silica sol was 8.0 molecules/nm$^2$, to thereby produce 1,369.1 g of an aqueous sol.

The aqueous silica sol of Example 11 was evaluated for pH, electrical conductivity, viscosity, and average particle diameter by the DLS method.

The amount of bonded silane in the aqueous silica sol of Example 11 was evaluated according to (Evaluation of Amount of Bonded Silane).

A salt resistance test sample was prepared according to (Preparation of Salt Resistance Test Sample), and the sample was maintained at 120° C. for 10 hours according to (High-Temperature Salt Resistance Evaluation-2), followed by evaluation of the high-temperature salt resistance of the sample removed from the container.

Example 12

The same operation as in Example 1 was performed, except that 228.2 g of lactic acid was added to an aqueous silica sol (SNOWTEX (trade name) ST-O available from Nissan Chemical Corporation, average particle diameter by the BET method: 11.7 nm, average particle diameter by the DLS method: 18.6 nm) and the mixture was stirred with a magnetic stirrer, and 130.7 g of aminoethylaminopropylmethyldimethoxysilane (KBM-602 available from Shin-Etsu Chemical Co., Ltd.) was added to the mixture so that the amount of the silane compound relative to the surface area of the silica in the aqueous silica sol was 8.0 molecules/nm$^2$, to thereby produce 1,358.9 g of an aqueous sol.

The aqueous silica sol of Example 12 was evaluated for pH, electrical conductivity, viscosity, and average particle diameter by the DLS method.

The amount of bonded silane in the aqueous silica sol of Example 12 was evaluated according to (Evaluation of Amount of Bonded Silane).

A salt resistance test sample was prepared according to (Preparation of Salt Resistance Test Sample), and the sample was maintained at 120° C. for 10 hours according to (High-Temperature Salt Resistance Evaluation-2), followed by evaluation of the high-temperature salt resistance of the sample removed from the container.

Example 13

The same operation as in Example 1 was performed, except that 179.4 g of 3-glycidoxypropyltrimethoxysilane (Dynasylan GLYMO, available from Evonik) was added to an aqueous silica sol (SNOWTEX (trade name) ST-OXS available from Nissan Chemical Corporation, silica concentration: 10.5% by mass, average particle diameter by the BET method: 5.0 nm, average particle diameter by the DLS method: 8.1 nm) so that the amount of the silane compound relative to the surface area of the silica in the aqueous silica sol was 8.0 molecules/nm$^2$, to thereby produce 1,179.4 g of an aqueous sol.

The aqueous silica sol of Example 13 was evaluated for pH, electrical conductivity, viscosity, and average particle diameter by the DLS method.

The amount of bonded silane in the aqueous silica sol of Example 13 was evaluated according to (Evaluation of Amount of Bonded Silane).

A salt resistance test sample was prepared according to (Preparation of Salt Resistance Test Sample), and the sample was maintained at 100° C. for 10 hours according to (High-Temperature Salt Resistance Evaluation-1), followed by evaluation of the high-temperature salt resistance of the sample removed from the container.

Example 14

The same operation as in Example 1 was performed, except that 159.0 g of 3-glycidoxypropyltrimethoxysilane (Dynasylan GLYMO, available from Evonik) was added to an aqueous silica sol (SNOWTEX (trade name) ST-OL available from Nissan Chemical Corporation, silica concentration: 20.5% by mass, average particle diameter by the BET method: 45.0 nm, average particle diameter by the DLS method: 78.0 nm) so that the amount of the silane compound relative to the surface area of the silica in the aqueous silica sol was 32.7 molecules/nm$^2$, to thereby produce 1,159.0 g of an aqueous sol.

The aqueous silica sol of Example 14 was evaluated for pH, electrical conductivity, viscosity, and average particle diameter by the DLS method.

The amount of bonded silane in the aqueous silica sol of Example 14 was evaluated according to (Evaluation of Amount of Bonded Silane).

A salt resistance test sample was prepared according to (Preparation of Salt Resistance Test Sample), and the sample was maintained at 100° C. for 10 hours according to (High-Temperature Salt Resistance Evaluation-1), followed by evaluation of the high-temperature salt resistance of the sample removed from the container.

Comparative Example 1

An aqueous silica sol (SNOWTEX (trade name) ST-O available from Nissan Chemical Corporation) was used as the aqueous silica sol of Comparative Example 1.

The aqueous silica sol of Comparative Example 1 was evaluated for pH, electrical conductivity, viscosity, and the DLS average particle diameter of aqueous silica sol (silica particles).

The amount of bonded silane in the aqueous silica sol of Comparative Example 1 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Comparative Example 2

The same operation as in Example 2 was performed to thereby produce 1,149.7 g of an aqueous silica sol.

800 g of pure water was added to 200 g of the aqueous silica sol of Example 2, and the mixture was subjected to ultrafiltration until 200 g of the liquid was discharged, followed by addition of 800 g of pure water again. The same operation was repeated four times in total, to thereby prepare 200 g of a free-silane-removed aqueous silica sol.

The aqueous silica sol of Comparative Example 2 was evaluated for pH, electrical conductivity, viscosity, and average particle diameter by the DLS method.

The amount of bonded silane in the aqueous silica sol of Comparative Example 2 was evaluated according to (Evaluation of Amount of Bonded Silane).

A salt resistance test sample was prepared according to (Preparation of Salt Resistance Test Sample), and the sample was maintained at 100° C. for 10 hours according to (High-Temperature Salt Resistance Evaluation-1), followed by evaluation of the high-temperature salt resistance of the sample removed from the container.

Comparative Example 3

The same operation as in Example 1 was performed, except that 35.1 g of methyltimethoxysilane (KBM-13 available from Shin-Etsu Chemical Co., Ltd.) was added to an aqueous silica sol (SNOWTEX (trade name) ST-O available from Nissan Chemical Corporation, average particle diameter by the BET method: 11.7 nm, average particle diameter by the DLS method: 18.6 nm) so that the amount of the silane compound relative to the surface area of the silica in the aqueous silica sol was 2.0 molecules/nm$^2$, to thereby produce 1,035.1 g of an aqueous sol.

The aqueous silica sol of Comparative Example 3 was evaluated for pH, electrical conductivity, viscosity, and average particle diameter by the DLS method.

The amount of bonded silane in the aqueous silica sol of Comparative Example 3 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Comparative Example 4

A 2,000-mL glass-made eggplant-shaped flask was charged with 1,000 g of an aqueous silica sol (SNOWTEX (trade name) ST-O available from Nissan Chemical Corporation, silica concentration: 20.5% by mass, average particle diameter by the BET method: 11.7 nm, average particle diameter by the DLS method: 18.6 nm) and a magnetic stirring bar. Thereafter, while the aqueous silica sol was stirred with a magnetic stirrer, 149.7 g of 3-glycidoxypropyltrimethoxysilane (Dynasylan GLYMO, available from Evonik) was added to the aqueous silica sol so that the amount of the silane compound relative to the surface area of the silica in the aqueous silica sol was 8.0 molecules/nm$^2$, to thereby produce 1,149.7 g of an aqueous sol.

The aqueous silica sol of Comparative Example 4 was evaluated for pH, electrical conductivity, viscosity, and average particle diameter by the DLS method.

The amount of bonded silane in the aqueous silica sol of Comparative Example 4 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Comparative Example 5

The same operation as in Example 9 was performed to thereby produce 1,254.3 g of an aqueous silica sol.

800 g of pure water was added to 200 g of the aqueous silica sol of Example 9, and the mixture was subjected to ultrafiltration until 200 g of the liquid was discharged, followed by addition of 800 g of pure water again. The same operation was repeated four times in total, to thereby prepare 200 g of a free-silane-removed aqueous silica sol.

The aqueous silica sol of Comparative Example 5 was evaluated for pH, electrical conductivity, viscosity, and average particle diameter by the DLS method.

The amount of bonded silane in the aqueous silica sol of Comparative Example 5 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Comparative Example 6

The same operation as in Example 10 was performed to thereby produce 1,227.7 g of an aqueous silica sol.

800 g of pure water was added to 200 g of the aqueous silica sol of Example 10, and the mixture was subjected to ultrafiltration until 200 g of the liquid was discharged, followed by addition of 800 g of pure water again. The same operation was repeated four times in total, to thereby prepare 200 g of a free-silane-removed aqueous silica sol. The aqueous silica sol of Comparative Example 6 was evaluated for pH, electrical conductivity, viscosity, and average particle diameter by the DLS method.

The amount of bonded silane in the aqueous silica sol of Comparative Example 6 was evaluated according to (Evaluation of Amount of Bonded Silane).

Comparative Example 7

An aqueous silica sol (SNOWTEX (trade name) ST-OXS available from Nissan Chemical Corporation) was used as the aqueous silica sol of Comparative Example 7.

The aqueous silica sol of Comparative Example 7 was evaluated for pH, electrical conductivity, viscosity, and the DLS average particle diameter of aqueous silica sol (silica particles.)

The amount of bonded silane in the aqueous silica sol of Comparative Example 7 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Comparative Example 8

An aqueous silica sol (SNOWTEX (trade name) ST-OL available from Nissan Chemical Corporation) was used as the aqueous silica sol of Comparative Example 8.

The aqueous silica sol of Comparative Example 8 was evaluated for pH, electrical conductivity, viscosity, and the DLS average particle diameter of aqueous silica sol (silica particles).

The amount of bonded silane in the aqueous silica sol of Comparative Example 8 was evaluated according to (Evaluation of Amount of Bonded Silane).

A salt resistance test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

A brine test sample was prepared according to (Preparation of Salt Resistance Test Sample), and the sample was maintained at 20° C. for 10 hours according to (Room-Temperature Salt Resistance Evaluation), followed by evaluation of the room-temperature salt resistance of the sample removed from the container.

Tables 1 to 6 show the compositions (component concentrations) of the aqueous silica sols of the Examples and the results of the salt resistant tests of the aqueous silica sols. Tables 7 and 8 show the compositions (component concentrations) of the aqueous silica sols of the Comparative Examples and the results of the salt resistant tests of the aqueous silica sols.

TABLE 1

|  |  | Example 1 | Example 2 | Example 3 | Example 4 | Example 5 | Example 6 |
|---|---|---|---|---|---|---|---|
| Aqueous silica sol |  | ST-O | ST-O | ST-O | ST-O | ST-O | ST-O |
| Silane type |  | GPS | GPS | GPS | GPS | MTMS | DMS |
| Amount of added silane | molecules/nm$^2$ | 0.5 | 8.0 | 30.8 | 46.2 | 0.5 | 0.5 |
| Amount of bonded silane | molecules/nm$^2$ | 0.4 | 1.5 | 4.5 | 5.9 | 0.4 | 0.4 |
| Amount of free silane | molecules/nm$^2$ | 0.1 | 6.5 | 26.3 | 40.3 | 0.1 | 0.1 |
| Amount of free silane/amount of bonded silane |  | 0.2 | 4.4 | 5.8 | 6.8 | 0.2 | 0.2 |
| Silica concentration | % by mass | 20.4 | 21.1 | 22.5 | 22.9 | 20.5 | 20.6 |

TABLE 2

|  |  | Example 7 | Example 8 | Example 9 | Example 10 | Example 11 | Example 12 |
|---|---|---|---|---|---|---|---|
| Aqueous silica sol |  | ST-O | ST-O | ST-O | ST-O | ST-O | ST-O |
| Silane type |  | EPCHS | TFPS | APTES | APTMS | AEAPTMS | AEAPMDMS |
| Amount of added silane | molecules/nm$^2$ | 0.5 | 0.5 | 8.0 | 8.0 | 8.0 | 8.0 |
| Amount of bonded silane | molecules/nm$^2$ | 0.3 | 0.3 | 1.0 | 1.2 | 0.8 | 0.7 |
| Amount of free silane | molecules/nm$^2$ | 0.2 | 0.2 | 7.0 | 6.8 | 7.2 | 7.3 |
| Amount of free silane/amount of bonded silane |  | 0.5 | 0.6 | 6.7 | 5.9 | 9.7 | 11.1 |
| Silica concentration | % by mass | 20.5 | 20.4 | 19.0 | 20.0 | 18.0 | 18.0 |

TABLE 3

|  |  | Example 13 | Example 14 |
|---|---|---|---|
| Aqueous silica sol |  | ST-OXS | ST-OL |
| Silane type |  | GPS | GPS |
| Amount of added silane | molecules/nm$^2$ | 8.0 | 32.7 |
| Amount of bonded silane | molecules/nm$^2$ | 2.0 | 3.8 |
| Amount of free silane | molecules/nm$^2$ | 6.0 | 28.9 |
| Amount of free silane/amount of bonded silane |  | 3.1 | 7.7 |
| Silica concentration | % by mass | 12.8 | 21.5 |

TABLE 4

|  |  | Example 1 | Example 2 | Example 3 | Example 4 | Example 5 | Example 6 |
|---|---|---|---|---|---|---|---|
| Physical properties of aqueous silica sol |  |  |  |  |  |  |  |
| pH |  | 3.0 | 2.8 | 2.8 | 2.8 | 2.9 | 3.0 |
| Electrical conductivity | mS/cm | 0.5 | 0.4 | 0.1 | 0.1 | 0.5 | 0.5 |
| Viscosity | mPa·s | 5.0 | 6.5 | 19.9 | 34.3 | 4.9 | 5.0 |
| DLS average particle diameter | nm | 21.5 | 23.2 | 22.5 | 22.9 | 21.2 | 21.3 |
| Physical properties of salt resistance evaluation sample |  |  |  |  |  |  |  |
| Salt concentration | % by mass | 4 | 4 | 4 | 4 | 4 | 4 |
| Silica concentration | % by mass | 0.5 | 0.5 | 0.5 | 0.5 | 0.5 | 0.5 |
| pH |  | 7.2 | 7.5 | 7.2 | 7.3 | 7.1 | 7.1 |
| Electrical conductivity | mS/cm | 46.4 | 45.8 | 44.2 | 45.3 | 44.6 | 41.5 |

TABLE 4-continued

|  |  | Example 1 | Example 2 | Example 3 | Example 4 | Example 5 | Example 6 |
|---|---|---|---|---|---|---|---|
| DLS average particle diameter (a) | nm | 25.6 | 25.3 | 28.3 | 31.6 | 24.5 | 32.3 |
| Salt resistance evaluation | Evaluation procedure | Room-temperature salt resistance evaluation | High-temperature salt resistance evaluation-1 | High-temperature salt resistance evaluation-1 | High-temperature salt resistance evaluation-1 | High-temperature salt resistance evaluation-1 | Room-temperature salt resistance evaluation |
| Test conditions |  | 20° C. × 10 hr | 100° C. × 10 hr | 100° C. × 10 hr | 100° C. × 10 hr | 100° C. × 10 hr | 20° C. × 10 hr |
| pH |  | 7.2 | 7.4 | 8.3 | 7.8 | 7.4 | 7.2 |
| Electrical conductivity | mS/cm | 46.5 | 43.0 | 43.7 | 47.6 | 45.3 | 45.7 |
| DLS average particle diameter (b) | nm | 26.3 | 38.5 | 23.7 | 26.9 | 48.8 | 37.7 |
| Appearance |  | Transparent liquid of colloid color | Transparent liquid of colloid color | Transparent liquid of colloid color | Transparent liquid of colloid color | Transparent liquid of colloid color | Transparent liquid of colloid color |
| Ratio of DLS average particle diameter (b) after salt resistance test/DLS average particle diameter (a) before test |  | 1.0 | 1.5 | 0.8 | 0.9 | 2.0 | 1.2 |
| Evaluation results of salt resistance |  | A | B | A | A | C | B |

TABLE 5

|  |  | Example 7 | Example 8 | Example 9 | Example 10 | Example 11 | Example 12 |
|---|---|---|---|---|---|---|---|
| Physical properties of aqueous silica sol |  |  |  |  |  |  |  |
| pH |  | 2.9 | 2.9 | 3.9 | 3.9 | 3.9 | 3.6 |
| Electrical conductivity | mS/cm | 0.5 | 0.6 | 7.0 | 7.6 | 10.3 | 9.0 |
| Viscosity | mPa · s | 5.2 | 5.2 | 6.4 | 6.4 | 7.9 | 7.3 |
| DLS average particle diameter | nm | 21.2 | 21.3 | 21.3 | 21.8 | 21.9 | 21.1 |
| Physical properties of salt resistance evaluation sample |  |  |  |  |  |  |  |
| Salt concentration | % by mass | 4 | 4 | 4 | 4 | 4 | 4 |
| Silica concentration | % by mass | 0.5 | 0.5 | 0.5 | 0.5 | 0.5 | 0.5 |
| pH |  | 7.3 | 7.2 | 3.9 | 3.9 | 3.8 | 3.8 |
| Electrical conductivity | mS/cm | 47.3 | 46.1 | 45.8 | 45.9 | 44.9 | 44.1 |
| DLS average particle diameter (a) | nm | 41.9 | 25.7 | 21.5 | 21.7 | 22.8 | 21.9 |
| Salt resistance evaluation | Evaluation procedure | Room-temperature salt resistance evaluation | Room-temperature salt resistance evaluation | Room-temperature salt resistance evaluation | Room-temperature salt resistance evaluation | High-temperature salt resistance evaluation-2 | High-temperature salt resistance evaluation-2 |
| Test conditions |  | 20° C. × 10 hr | 20° C. × 10 hr | 20° C. × 10 hr | 20° C. × 10 hr | 120° C. × 10 hr | 120° C. × 10 hr |
| pH |  | 7.3 | 7.2 | 3.9 | 3.8 | 3.8 | 3.5 |
| Electrical conductivity | mS/cm | 47.1 | 45.7 | 41.2 | 41.3 | 43.6 | 47.1 |
| DLS average particle diameter (b) | nm | 60.3 | 28.5 | 21.3 | 21.3 | 22.5 | 21.6 |
| Appearance |  | Transparent liquid of colloid color | Transparent liquid of colloid color | Transparent liquid of colloid color | Transparent liquid of colloid color | Transparent liquid of colloid color | Transparent liquid of colloid color |
| Ratio of DLS average particle diameter (b) after salt resistance test/DLS average particle diameter (a) before test |  | 1.4 | 1.1 | 1.0 | 1.0 | 1.0 | 1.0 |
| Evaluation results of salt resistance |  | B | A | A | A | A | A |

TABLE 6

|  |  | Example 13 | Example 14 |
|---|---|---|---|
| Physical properties of aqueous silica sol |  |  |  |
| pH |  | 2.9 | 2.7 |
| Electrical conductivity | mS/cm | 0.3 | 0.3 |
| Viscosity | mPa·s | 4.5 | 6.5 |
| DLS average particle diameter | nm | 15.4 | 78.6 |
| Physical properties of salt resistance evaluation sample |  |  |  |
| Salt concentration | % by mass | 4 | 4 |
| Silica concentration | % by mass | 0.5 | 0.5 |
| pH |  | 7.3 | 7.8 |
| Electrical conductivity | mS/cm | 40.4 | 41.2 |
| DLS average particle diameter (a) | nm | 25.1 | 80.3 |
| Salt resistance | Evaluation procedure | High-temperature salt resistance evaluation-1 | High-temperature salt resistance evaluation-1 |
| Test conditions |  | 100° C. × 10 hr | 100° C. × 10 hr |
| pH |  | 7.3 | 7.8 |
| Electrical conductivity | mS/cm | 39.1 | 41.8 |
| DLS average particle diameter (b) | nm | 25.7 | 124.4 |
| Appearance |  | Transparent liquid of colloid color | Transparent liquid of colloid color |
| Ratio of DLS average particle diameter (b) after salt resistance test/DLS average particle diameter (a) before test |  | 1.0 | 1.5 |
| Evaluation results of salt resistance |  | A | B |

TABLE 7

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Aqueous silica sol |  | ST-O | ST-O | ST-O | ST-O | ST-O | ST-O | ST-OXS | ST-OL |
| Silane |  | — | GPS | MTMS | GPS | APTES | APTMS | — | — |
| Amount of added silane | molecules/nm² | 0.0 | 8.0 | 2.0 | 8.0 | 8.0 | 8.0 | 0.0 | 0.0 |
| Amount of bonded silane | molecules/nm² | 0.0 | 1.5 | 1.8 | 0.1 | 1.0 | 1.2 | 0.0 | 0.0 |
| Amount of free silane | molecules/nm² | 0.0 | 0.0 | 0.2 | 7.9 | 0.0 | 0.0 | 0.0 | 0.0 |
| Amount of free silane/amount of bonded silane |  | 0.0 | 0.0 | 0.1 | 79.0 | 0.0 | 0.0 | 0.0 | 0.0 |
| Silica concentration | % by mass | 20.5 | 17.4 | 21.0 | 21.3 | 8.6 | 8.6 | 10.5 | 20.5 |

TABLE 8

| Physical properties of aqueous silica sol |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| pH |  | 2.7 | 2.9 | 2.9 | 2.9 | 5.8 | 5.5 | 3.1 | 2.9 |
| Electrical conductivity | mS/cm | 0.7 | 0.5 | 0.5 | 0.3 | 7.8 | 0.5 | 0.3 | 0.5 |
| Viscosity | mPa·s | 4.9 | 5.6 | 4.1 | 6.4 | 2.3 | 4.1 | 4.5 | 4.0 |
| DLS average particle diameter | nm | 18.6 | 20.2 | 22.2 | 20.9 | 18.8 | 18.9 | 8.1 | 81.2 |
| Physical properties of salt resistance evaluation sample |  |  |  |  |  |  |  |  |  |
| Salt concentration | % by mass | 4 | 4 | 4 | 4 | 4 | 4 | 4 | 4 |
| Silica concentration | % by mass | 0.5 | 0.5 | 0.5 | 0.5 | 0.5 | 0.5 | 0.5 | 0.5 |
| pH |  | 7.2 | 7.2 | 7.2 | 7.3 | 7.1 | 7.0 | 6.7 | 7.4 |
| Electrical conductivity | mS/cm | 40.2 | 51.1 | 44.2 | 45.3 | 51.4 | 51.3 | 52.3 | 52.4 |
| DLS average particle diameter (a) | nm | 29.6 | 22.1 | 107.9 | 1966.0 | 62.95 | 35.9 | 28.4 | 1402 |
| Salt resistance evaluation | Evaluation procedure | Room-temperature salt resistance evaluation | High-temperature salt resistance evaluation-1 | Room-temperature salt resistance evaluation | Room-temperature salt resistance evaluation | Room-temperature salt resistance evaluation | Room-temperature salt resistance evaluation | Room-temperature salt resistance evaluation | Room-temperature salt resistance evaluation |
| Test conditions |  | 20° C. × 10 hr | 100° C. × 10 hr | 20° C. × 10 hr | 20° C. × 10 hr | 20° C. × 10 hr | 20° C. × 10 hr | 20° C. × 10 hr | 20° C. × 10 hr |

TABLE 8-continued

| Physical properties of aqueous silica sol | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| pH | | 7.3 | 6.9 | 7.5 | 8.4 | 7.2 | 7.2 | 6.9 | 7.5 |
| Electrical conductivity | mS/cm | 40.6 | 49.6 | 45.8 | 45.9 | 43.8 | 45.3 | 52.6 | 52.9 |
| DLS average particle diameter (b) | nm | 73.3 | 291.6 | 223.0 | 4265.0 | 2244.0 | 2127.0 | 114.9 | 1721 |
| Appearance | | Slightly white turbid | White turbid | White turbid and solid-liquid separation | White turbid and solid-liquid separation | White turbid and solid-liquid separation | White turbid and solid-liquid separation | Slightly white turbid | White turbid and solid-liquid separation |
| Ratio of DLS average particle diameter (b) after salt resistance test/DLS average particle diameter (a) before test | | 2.5 | 13.2 | 2.1 | 2.2 | 35.6 | 59.2 | 4.0 | 1.2 |
| Evaluation results of salt resistance | | D | D | E | E | E | E | D | E |

The types of silane compounds (abbreviations) shown in the tables are as follows.

LTAC: lauryltrimethylammonium chloride "trade name CATIOGEN TML," active ingredient: 30.0%, available from DKS Co. Ltd.

GPS: 3-glycidoxypropyltrimethoxysilane "trade name Dynasylan GLYMO," available from Evonik MTMS: methyltrimethoxysilane "trade name KBM-13," available from Shin-Etsu Chemical Co., Ltd.

DMS: dimethyldimethoxysilane "trade name KBM-22," available from Shin-Etsu Chemical Co., Ltd.

EPCHS: (3,4-epoxycyclohexyl)ethyltrimethoxysilane "trade name KBM-303," available from Shin-Etsu Chemical Co., Ltd.

TFPS: trifluoropropyltrimethoxysilane "trade name KBM-7103," available from Shin-Etsu Chemical Co., Ltd.

APTES: 3-aminopropyltriethoxysilane "trade name KBE-903," available from Shin-Etsu Chemical Co., Ltd.

APTMS: 3-aminopropyltrimethoxysilane "trade name KBM-903," available from Shin-Etsu Chemical Co., Ltd.

AEAPTMS: N-2-(aminoethyl)-3-aminopropyltrimethoxysilane "trade name KBM-603," available from Shin-Etsu Chemical Co., Ltd.

AEAPMDMS: N-2-(aminoethyl)-3-aminopropylmethyldimethoxysilane "trade name KBM-602," available from Shin-Etsu Chemical Co., Ltd.

(Determination of Bonding State of Free Silane)

The aqueous silica sol of the present invention can be expected to be more effective in improving the stability of silica particles depending on the form of free silane contained in the aqueous sol. The form of free silane was analyzed as follows: 6 g of the aqueous silica sol was added to 15-mL centrifugal filter unit (trade name: Amicon Ultra-15, available from Merck); the aqueous silica sol was subjected to centrifugal treatment at a centrifugal force of 2,770 G for 20 minutes; and the free-silane-containing liquid discharged to the lower portion of the unit was analyzed by Si-NMR, to thereby calculate the amount of a T structure or D structure contained in the liquid.

The T structure was analyzed in Examples 2, 9, 10, 13, and 14 (the analysis results are shown in Table 9), and the D structure was analyzed in Example 12 (the analysis results are shown in Table 10).

TABLE 9

| | T0 | T1 | T2 | T3 | (T2 + T3)/ (T0 + T1) | (T1 + T2 + T3)/(T0) |
|---|---|---|---|---|---|---|
| Example 2 | 3% | 7% | 36% | 55% | 9.1 | 32.3 |
| Example 9 | 9% | 15% | 40% | 37% | 3.2 | 10.2 |
| Example 10 | 9% | 16% | 38% | 38% | 3.0 | 10.1 |
| Example 13 | 3% | 5% | 25% | 67% | 11.5 | 32.3 |
| Example 14 | 2% | 4% | 26% | 68% | 15.7 | 49.0 |

TABLE 10

| | D0 | D1 | D2 | (D1 + D2)/D0 | D2/(D0 + D1) |
|---|---|---|---|---|---|
| Example 12 | 32% | 52% | 16% | 2.1 | 0.2 |

(Determination of Bonding State of Bonded Silane)

The aqueous silica sol of the present invention can be expected to be more effective in improving the stability of silica particles when some molecules of the silane compound are bonded to the surfaces of the silica particles. The form of bonded silane was analyzed as follows: the liquid prepared through (removal of free silane) was analyzed by Si-NMR to thereby calculate the amount of a Q structure.

The Q structure was analyzed in Examples 2, 5, 6, 7, 8, 9, 10, 11, 12, 13, 14, and Comparative Examples 1, 7, and 8. The analysis results are shown in Table 11.

TABLE 11

| | Q2 | Q3 | Q4 |
|---|---|---|---|
| Example 2 | 2% | 18% | 80% |
| Example 5 | 2% | 21% | 77% |
| Example 6 | 2% | 20% | 78% |
| Example 7 | 2% | 22% | 76% |
| Example 8 | 2% | 21% | 77% |
| Example 9 | 2% | 21% | 77% |
| Example 10 | 2% | 21% | 77% |
| Example 11 | 2% | 20% | 78% |
| Example 12 | 2% | 20% | 78% |
| Example 13 | 2% | 22% | 76% |
| Example 14 | 0% | 8% | 92% |
| Comparative Example 1 | 4% | 20% | 75% |
| Comparative Example 7 | 5% | 25% | 70% |
| Comparative Example 8 | 2% | 11% | 87% |

(Specific Surface Area Calculated from Amount of Adsorbed Water Vapor/Specific Surface Area Calculated from Amount of Adsorbed Nitrogen Gas)

The aqueous silica sol of the present invention can be expected to be more effective in improving the stability of silica particles when silanol groups on the surfaces of the silica particles are replaced with molecules of the silane compound having a functional group. The quotient obtained by dividing the specific surface area calculated from the amount of water vapor adsorbed on the silica particles by the specific surface area calculated from the amount of nitrogen gas adsorbed thereon; i.e., the ratio (specific surface area calculated from the amount of adsorbed water vapor)/(specific surface area calculated from the amount of adsorbed nitrogen gas) indicates that silanol groups on the surfaces of the silica particles are replaced with molecules of the silane compound having a functional group. The amount of adsorbed water vapor and the amount of adsorbed nitrogen gas were analyzed through the procedures described in (Measurement of Amount of Adsorbed Water Vapor) and (Measurement of Amount of Adsorbed Nitrogen Gas).

The amount of adsorbed water vapor and the amount of adsorbed nitrogen gas were measured in Examples 1, 2, 5, 7, 8, 13, and 14 and Comparative Examples 1, 3, 7, and 8, and the ratio after the treatment with the silane compound was divided by the ratio before the treatment with the silane compound (i.e., the ratio (specific surface area calculated from the amount of adsorbed water vapor)/(specific surface area calculated from the amount of adsorbed nitrogen gas). The results of measurement are shown in Table 12.

silane, wherein Q4 corresponds to the case where the number of bridging oxygen atoms between silicon atoms of the silica particles is 4/2 per one silicon atom as determined by Si-NMR observation, wherein the hydrolyzable silane is at least one silane compound selected from the group consisting of silane compounds of the following Formulae (1) to (3):

$R^3_a Si(R^4)_{4-a}$   Formula (1)

$[R^5_b Si(R^6)_{3-b}]_2 Y_c$   Formula (2)

$R^7_d Si(R^8)_{4-e}$   Formula (3)

in Formula (1), $R^3$ is an alkyl group, a halogenated alkyl group, an alkenyl group, or an organic group having an epoxy group, a (meth)acryloyl group, a mercapto group, an amino group, a ureido group, or a cyano group and is bonded to a silicon atom via an Si—C bond; $R^4$ is an alkoxy group, an acyloxy group, or a halogen group; and a is an integer of 1 to 3; and in Formulae (2) and (3), $R^5$ and $R^7$ are each a $C_{1-3}$ alkyl group and bonded to a silicon atom via an Si—C bond; $R^6$ and $R^8$ are each an alkoxy group, an acyloxy group, or a halogen group; Y is an alkylene group, an NH group, or an oxygen atom; at least one of $R^5$ and $R^7$ is

TABLE 12

| | Specific surface area calculated from amount of adsorbed water vapor [m²/g] | Specific surface area calculated from amount of adsorbed nitrogen gas [m²/g] | Specific surface area calculated from amount of adsorbed water vapor/specific surface area calculated from amount of adsorbed nitrogen gas | Specific surface area calculated from amount of adsorbed water vapor/specific surface area calculated from amount of adsorbed nitrogen gas (after treatment with silane compound/before treatment with silane compound) |
|---|---|---|---|---|
| Example 1 | 125.2 | 231.5 | 0.54 | 0.74 |
| Example 2 | 59.0 | 189.8 | 0.31 | 0.42 |
| Example 5 | 135.3 | 243.9 | 0.56 | 0.77 |
| Example 7 | 120.4 | 237.8 | 0.51 | 0.70 |
| Example 8 | 124.8 | 232.5 | 0.54 | 0.74 |
| Example 13 | 104.6 | 236.4 | 0.44 | 0.36 |
| Example 14 | 10.0 | 46.0 | 0.22 | 0.33 |
| Comparative Example 1 | 165.8 | 226.7 | 0.73 | 1.00 |
| Comparative Example 3 | 56.7 | 211.5 | 0.27 | 0.37 |
| Comparative Example 7 | 512.5 | 421.2 | 1.22 | 1.00 |
| Comparative Example 8 | 23.9 | 62.0 | 0.39 | 1.00 |

INDUSTRIAL APPLICABILITY

The present invention can provide a dispersion of inorganic oxide particles (in particular, a dispersion of silica particles) exhibiting a high dispersion stability even at a high temperature or a high salt content.

The invention claimed is:

1. A dispersion comprising, as a dispersoid, silane-bonded silica-containing inorganic oxide particles having surfaces modified with a hydrolyzable silane, and a liquid medium as a dispersion medium, wherein the dispersion medium contains a hydrolysate of the hydrolyzable silane; the ratio of (the number of moles of silicon atoms of the hydrolysate of the hydrolyzable silane in the dispersion medium)/(the number of moles of silicon atoms of the silane bonded to the surfaces of the inorganic oxide particles) is 0.2 to 30; and Q4 is greater than that before the surface modification with the silane, wherein Q4 corresponds to the case where the number of bridging oxygen atoms between silicon atoms of the silica particles is 4/2 per one silicon atom as determined by Si-NMR observation, a $C_{1-3}$ alkyl group and bonded to a silicon atom via an Si—C bond; b is an integer of 1 to 3; c is an integer of 0 or 1; d is an integer of 1 to 3; and e is an integer of 1 to 3; and either:
wherein, in the hydrolysate of the hydrolyzable silane contained in the dispersion medium, the hydrolysate of a silane compound of Formula (1) wherein a is an integer of 1 contains a silane compound exhibiting a specific (T2+T3)/(T0+T1) ratio of 2 to 15 or a specific (T1+T2+T3)/(T0) ratio of 5 to 100 wherein T0, T1, T2, and T3 respectively correspond to structures such that the number of bridging oxygen atoms between silicon atoms is 0/2, 1/2, 2/2, and 3/2 per one silicon atom as determined by Si-NMR observation, or wherein, in the hydrolysate of the hydrolyzable silane contained in the dispersion medium, the hydrolysate of a silane compound of Formula (1) wherein a is an integer of 2 contains a silane compound exhibiting a (D1+D2)/(D0) ratio of 0.1 to 10 or a (D2)/(D0+D1) ratio of 0.01 to 10 wherein D0, D1, and D2 respectively correspond to structures such that the number of bridging oxygen atoms between silicon atoms is 0/2, 1/2, and 2/2 per one silicon atom as determined by Si-NMR observation.

2. The dispersion according to claim 1, wherein the silica-containing inorganic oxide particles have an average particle diameter of 5 nm to 100 nm and are silica particles or particles of silica and at least one inorganic oxide selected from the group consisting of alumina, tin oxide, zirconium oxide, titanium oxide, and antimony oxide; and the silica-containing inorganic oxide particles are silica particles, particles of a composite metal oxide of silica and another metal oxide, or composite oxide particles having a core-shell structure of silica and another metal oxide.

3. The dispersion according to claim 1, wherein the quotient obtained by dividing the amount of water vapor adsorbed on the silica-containing inorganic oxide particles by the amount of nitrogen gas adsorbed thereon; i.e., the ratio (specific surface area calculated from the amount of adsorbed water vapor)/(specific surface area calculated from the amount of adsorbed nitrogen gas) is 0.15 to 0.95 relative to that of silica particles before addition of the silane compound.

4. A production method for the dispersion according to claim 1, the production method comprising the following steps (A) and (B):
step (A): a step of preparing an aqueous dispersion of the silica-containing inorganic oxide particles; and
step (B): a step of adding a hydrolyzable silane to the aqueous dispersion of the silica-containing inorganic oxide particles at a pH of 2.0 to 6.5 so that the amount of the silane per surface area of the particles is 0.3 to 100 molecules/nm$^2$, stirring the resultant mixture at room temperature and then heating the mixture to a temperature of 50 to 99° C., and stirring the heated mixture for a period that is 1 to 100 times the stirring period at room temperature.

5. The production method according to claim 4 for producing a dispersion in an organic solvent as a dispersion medium, wherein the production method further comprises the following step (C) after the step (B):
step (C): a step of replacing the aqueous medium of the dispersion prepared in the step (B) with an organic solvent.

6. A dispersion comprising, as a dispersoid, silane-bonded silica-containing inorganic oxide particles having surfaces modified with a hydrolyzable silane, and a liquid medium as a dispersion medium, wherein the dispersion medium contains a hydrolysate of the hydrolyzable silane; and the ratio of (the number of moles of silicon atoms of the hydrolysate of the hydrolyzable silane in the dispersion medium)/(the number of moles of silicon atoms of the silane bonded to the surfaces of the inorganic oxide particles) is 0.2 to 30,
wherein the hydrolyzable silane is at least one silane compound selected from the group consisting of silane compounds of the following Formulae (1) to (3):

  Formula (1)

  Formula (2)

  Formula (3)

in Formula (1), R$^3$ is an alkyl group, a halogenated alkyl group, an alkenyl group, or an organic group having an epoxy group, a (meth)acryloyl group, a mercapto group, an amino group, a ureido group, or a cyano group and is bonded to a silicon atom via an Si—C bond; R$^4$ is an alkoxy group, an acyloxy group, or a halogen group; and a is an integer of 1 to 3; and in Formulae (2) and (3), R$^5$ and R$^7$ are each a C$_{1-3}$ alkyl group and bonded to a silicon atom via an Si—C bond; R$^6$ and R$^8$ are each an alkoxy group, an acyloxy group, or a halogen group; Y is an alkylene group, an NH group, or an oxygen atom; at least one of R$^5$ and R$^7$ is a C$_{1-3}$ alkyl group and bonded to a silicon atom via an Si—C bond; b is an integer of 1 to 3; c is an integer of 0 or 1; d is an integer of 1 to 3; and e is an integer of 1 to 3; and either:
wherein, in the hydrolysate of the hydrolyzable silane contained in the dispersion medium, the hydrolysate of a silane compound of Formula (1) wherein a is an integer of 1 contains a silane compound exhibiting a specific (T2+T3)/(T0+T1) ratio of 2 to 15 or a specific (T1+T2+T3)/(T0) ratio of 5 to 100 wherein T0, T1, T2, and T3 respectively correspond to structures such that the number of bridging oxygen atoms between silicon atoms is 0/2, 1/2, 2/2, and 3/2 per one silicon atom as determined by Si-NMR observation, or
wherein, in the hydrolysate of the hydrolyzable silane contained in the dispersion medium, the hydrolysate of a silane compound of Formula (1) wherein a is an integer of 2 contains a silane compound exhibiting a (D1+D2)/(D0) ratio of 0.1 to 10 or a (D2)/(D0+D1) ratio of 0.01 to 10 wherein D0, D1, and D2 respectively correspond to structures such that the number of bridging oxygen atoms between silicon atoms is 0/2, 1/2, and 2/2 per one silicon atom as determined by Si-NMR observation.

* * * * *